(12) United States Patent
Squires et al.

(10) Patent No.: US 7,081,189 B2
(45) Date of Patent: Jul. 25, 2006

(54) MICROFLUIDIC PUMPS AND MIXERS DRIVEN BY INDUCED-CHARGE ELECTRO-OSMOSIS

(75) Inventors: Todd M. Squires, Pasadena, CA (US); Martin Z. Bazant, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 393 days.

(21) Appl. No.: 10/319,949

(22) Filed: Dec. 16, 2002

(65) Prior Publication Data

US 2003/0164296 A1 Sep. 4, 2003

Related U.S. Application Data

(60) Provisional application No. 60/341,777, filed on Dec. 18, 2001.

(51) Int. Cl.
G01N 27/26 (2006.01)
(52) U.S. Cl. .................. 204/451; 204/600; 204/601; 204/547; 204/643
(58) Field of Classification Search ........ 204/450–455, 204/600–605, 547, 643
See application file for complete search history.

(56) References Cited

U.S. PATENT DOCUMENTS

| 4,908,112 A * | 3/1990 | Pace ................... 210/198.2 |
| 5,324,413 A * | 6/1994 | Gordon ................... 204/603 |
| 5,985,119 A | 11/1999 | Zanzucci et al. ........ 204/450 |
| 6,013,164 A | 1/2000 | Paul et al. ................ 204/450 |
| 6,019,882 A | 2/2000 | Paul et al. ................ 204/450 |
| 6,042,709 A | 3/2000 | Parce et al. .............. 204/453 |
| 6,086,572 A | 7/2000 | Johnson et al. ........... 604/503 |
| 6,264,825 B1 * | 7/2001 | Blackburn et al. ....... 205/777.5 |
| 6,277,257 B1 | 8/2001 | Paul et al. ................ 204/450 |
| 6,318,970 B1 | 11/2001 | Backhouse ................ 417/92 |
| 6,508,273 B1 * | 1/2003 | Van Den Berg ........... 137/827 |
| 6,805,783 B1 * | 10/2004 | Ohkawa ................... 204/454 |
| 6,890,411 B1 * | 5/2005 | Hayes et al. ............. 204/601 |

FOREIGN PATENT DOCUMENTS

WO WO 00/55502 9/2000
WO WO/01/94635 12/2001

OTHER PUBLICATIONS

"Space Charge of a Conducting Particle in the Outer-Limit Current Regime," Mishchuk et al. *Kolloidnyi Zhurnal*, May-Jun. 1990. vol. 52, No. 3, pp. 497-501.

"Electrophoresis of the Second Kind in a Hydrodynamic Flow," Dukhim et al. *Kolloinyi Zhurnal*. Sep.-Oct. 1998. vol. 50, No. 5, pp. 1031-1032.

(Continued)

*Primary Examiner*—Alex Noguerola
(74) *Attorney, Agent, or Firm*—Gauthier & Connors LLP

(57) ABSTRACT

A microfluidic device includes one or more microchannels providing a passageway for transmitting an electrolyte fluid. A field source provides a defined field in the one or more microchannels, wherein at least one conductor element that is placed in at least one specific location in the device. Interactions between the defined field and the at least one conductor element produce electro-osmotic flows so that the electrolyte fluid is driven across the one or more microchannels.

32 Claims, 8 Drawing Sheets

OTHER PUBLICATIONS

"Electrophoresis of the Second Kind for Metallic Particles," Dukhin et al. *Kolloinyi Zhurnal*, Nov.-Dec. 1998. vol. 50, No. 6, pp. 1222-1223.

"Electrophoresis of the Second Kind," Dukhim et al. *Kolloinyi Zhurnal*, May-Jun. 1997. vol. 49, No. 3, pp. 616-617.

"AC Electric-Field-Induced Fluid Flow in Microelectrodes," Morgan et al. *Journal of Colloid and Interface Science*. 1999. vol. 217. p. 420-422.

"Fluid Flow Induced by Nonuniform ac Electric Fields in Electrolytes on Microelectrodes. I. Experimental Measurements," Green et al. *Physical Review E*. Apr. 2000. vol. 61, No. 4.

"Fluid Flow Induced by Nonuniform ac Electric Fields in Electrolytes on Microelectrodes. II. A Linear Double-Layer Analysis," Gonzalez et al. Apr. 2000. vol. 61, No. 4.

* cited by examiner

MICROFLUIDIC PUMPS AND MIXERS DRIVEN BY INDUCED-CHARGE ELECTRO-OSMOSIS

PRIORITY INFORMATION

This application claims priority from provisional application Ser. No. 60/341,777 filed Dec. 18, 2001.

BACKGROUND OF THE INVENTION

The invention relates to the fields of microfluidics, micro-total-analysis systems (μTAS) and micro-electro-mechanical systems (MEMS), in particular microfluidic pumps and mixers driven by induced-charge electro-osmosis.

The ability to transport fluids in micron-sized channels is essential for many emerging technologies, such as in vivo drug delivery devices, micro-electro-mechanical systems (MEMS), and micro-total-analysis systems (μTAS). New methods for the rapid mixing of inhomogeneous fluids in micron-scale devices are also required, since the absence of turbulent mixing on these small length scales implies that mixing occurs by molecular diffusion alone. This typically takes from seconds to minutes—far too slow for envisioned applications. New technologies are thus required for the manipulation, transport and mixing of fluids on these small length scales.

Although MEMS-based mechanical pumps with moving parts have recently been developed, including peristaltic pumps, a variety of non-mechanical pumping strategies without moving parts have been used, e.g. based on electrical fields, thermal gradient, electrochemical reactions, surface tensions gradients, and patterned surfaces. Non-mechanical strategies for fluid manipulation become more efficient at very small scales because they are driven by surface phenomena. Moreover, they can be much cheaper to implement than mechanical MEMS-based strategies because they take advantage of nano-scale chemical effects already exhibited by many fluids used in biomedical and chemical engineering applications. They can also possess fewer parts, and are better suited for flexible devices, such as microfluidic fibers.

Perhaps the most popular non-mechanical fluid manipulation strategy is based on the phenomena of electro-osmosis, i.e. the fluid slip at a solid-electrolyte interface induced by a tangential electric field. The fluid is set into motion by strong electrostatic body forces exerted by excess ionic charge in diffuse boundary layers of thickness $\lambda=1$–$100$ nm near a solid interface. This effect, which has been studied extensively for more than a century in colloidal science and electrochemistry, is well suited for biomedical applications because the majority of bodily fluids, such as blood or lymph, are electrolytes with comparable ionic strengths. Moreover, the working electrode imposing spatially or temporally varying electric fields can be easily and cheaply built into microchannels with existing silicon-based micro-fabrication technology. Driving fluids with electric fields also facilitates integration with logic circuits for sensing and integration microfluidic devices.

The simplest electro-osmotic pumping technique is based on applying a DC field tangential to a field solid channel surface, presumed to have a uniform equilibrium zeta potential $\zeta$ or diffuse charge density q. In this case, the fluid-solid surface develops a 'slip velocity' given by the classical Helmholtz-Smoluchowski formula defined as $$\vec{u}_{\|} = -\left(\frac{\varepsilon\varepsilon_0\zeta}{\eta}\right)\vec{E}_{\|} = \left(\frac{q\lambda}{\eta}\right)\vec{E}_{\|} \qquad \text{EQ. 1}$$

with a prescribed $\zeta$ or q, where $\epsilon_0$ is the permittivity of vacuum, and $\epsilon$ and $\eta$ represent the dielectric constant and viscosity of the electrolytic fluid.

In spite of its appealing simplicity, however, there are several drawbacks to the use of DC electric fields, related to the fact that a steady current ($\vec{J}=\sigma\vec{E}$) must exist in order to maintain a steady field because every electrolyte has a non-negligible bulk conductivity. A steady current in turn implies the creation of ions at one electrode and removal of ions at the other via electrochemical reactions. This can cause a variety of problems. For example, the dissolution of the anode eventually destroys the electric circuit, causing irreversible failure. Microfluidic devices employing DC electric fields thus typically have short lifetimes, which can be acceptable in some applications, such as one-time drug delivery, but not in others, such as μTAS. A shorter lifetime also translates into a higher cost per unit of time of operation. The dissolution of the anode also injects metallic ions into the fluid, which can present safety hazards in biomedical applications or can interfere with chemical reactions in μTAS. Also, the depositions of ions at the cathode can lead to unstable deposits, which can break off or otherwise interfere with the bulk fluid. Furthermore, electrochemical reactions at electrodes inevitably cause electrolyte concentration gradients, which create complicated and potentially unwanted secondary bulk electric fields, as well as secondary electrokinetic phenomena at surfaces.

These problems can be solved using high-frequency AC fields, which can be safer, more reliable and more durable than using DC fields. Because AC fields are typically applied along closely spaced electrode arrays, much smaller voltages are required to achieve strong electric fields. Furthermore, the change in electrode polarity frustrates electrochemical reactions, helping avoid unwanted electrolysis reactions at the electrodes.

Since the fluid slip velocity of standard electro-osmosis used in EQ. 1 is linear in the applied field E, it averages to zero in an AC field. Therefore, different phenomena must be used to drive steady microfluidic flows using AC fields. For example, AC traveling waves on electrode arrays have been used to drive flows by coupling to thermal gradients. A pair of electrodes adjacently located on a glass slide, to which an AC voltage is applied, has recently been shown to drive a steady swirling flow, and a stationary AC wave on a locally asymmetric electrode array has been shown to pump fluid. Both of these applications work in a limited range of frequencies and rely on a subtle form of electro-osmosis involving induced charges on the electrodes. The electro-osmotic flow is driven by transient interactions between the high-frequency field and the self-induced changes in the diffuse-layer charge density along the electrode surfaces. The pumping effect is therefore a strictly non-equilibrium phenomenon which violates the ubiquitous assumption of a constant zeta potential underlying the classical theory of electro-osmosis. A similar generalization of existing theories is needed to understand another electro-osmotic phenomena described, which is the basis for the invention.

Although the available pumping techniques based on AC electric fields offer various advantages over DC methods, there are still serious drawbacks. Foremost among these is the need to microfabricate complex patterned-surface electrodes with elaborate micro-circuitry, which can be more costly, difficult, and prone to failure than their very simple DC counterparts. Another potential drawback is that patterned-surface devices are the "hard-wired" into the electrical circuitry and the physical structure of the surface itself, rendering them less versatile. These drawbacks of existing AC pumping methods, however, can be addressed by another form of induced-charge electro-osmosis, which form the basis for the present inventions, making very simple and versatile AC electro-osmotic microfluidic devices possible.

SUMMARY OF THE INVENTION

According to one aspect of the invention, there is provided a microfluidic device. The microfluidic device includes one or more microchannels providing a passageway for transmitting an electrolyte fluid. A field source provides a defined field in the one or more microchannels, wherein at least one conductor element that is placed in at least one specific location in the device. Interactions between the defined field and the at least one conductor element produce electro-osmotic flows so that the electrolyte fluid is driven across the one or more microchannels.

According to another aspect of the invention, there is provided a method of forming a microfluidic device. The method includes providing one or more microchannels transmitting a passageway for sending an electrolyte fluid. At least one conductor is provided element that is placed in at least one specific location in the device. Interactions are allowed between the defined field and the at least one conductor element. Electro-osmotic flows are produced so that the electrolyte fluid is driven across the one or more microchannels.

In yet another aspect of the invention, there is provided a microfluidic device. The microfluidic device comprising at least one conductor element that is placed in at least one specific location in said device. Interactions between a defined field and said at least one conductor element produce electro-osmotic flows.

DETAILED DESCRIPTION OF THE INVENTION

Figure 1A:
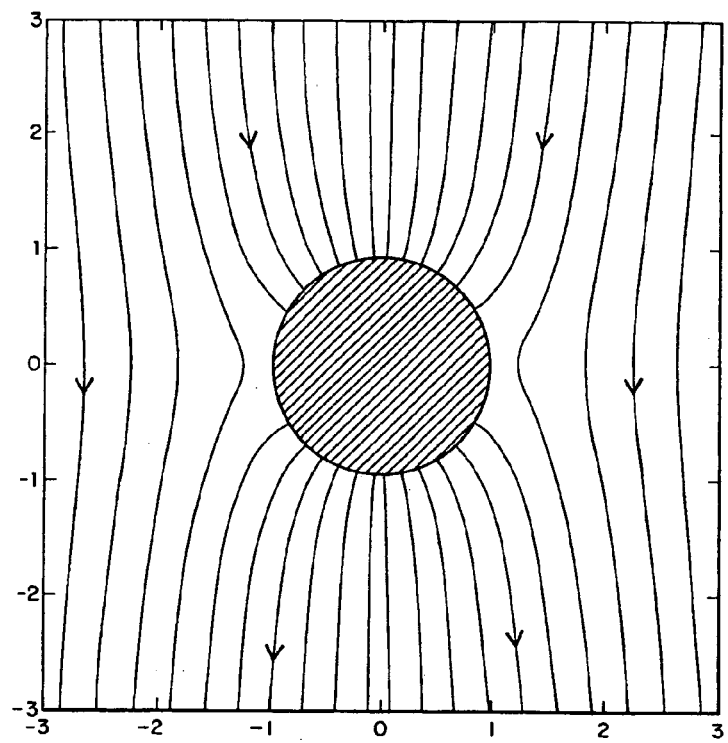
FIGS. 1A–1C are schematics of the evolution of an electric field around a solid conducting cylinder immersed in a liquid electrolyte.
Figure 1B:
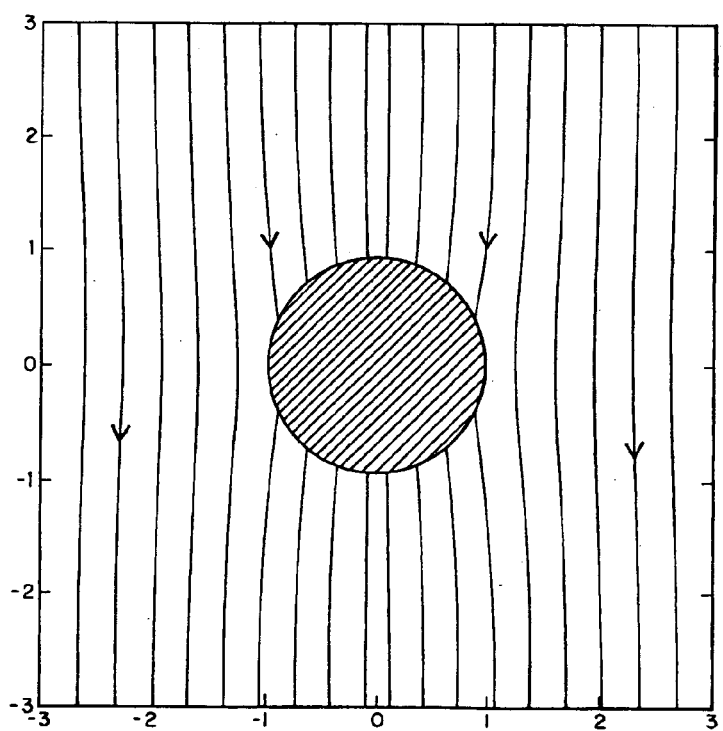
Figure 1C:
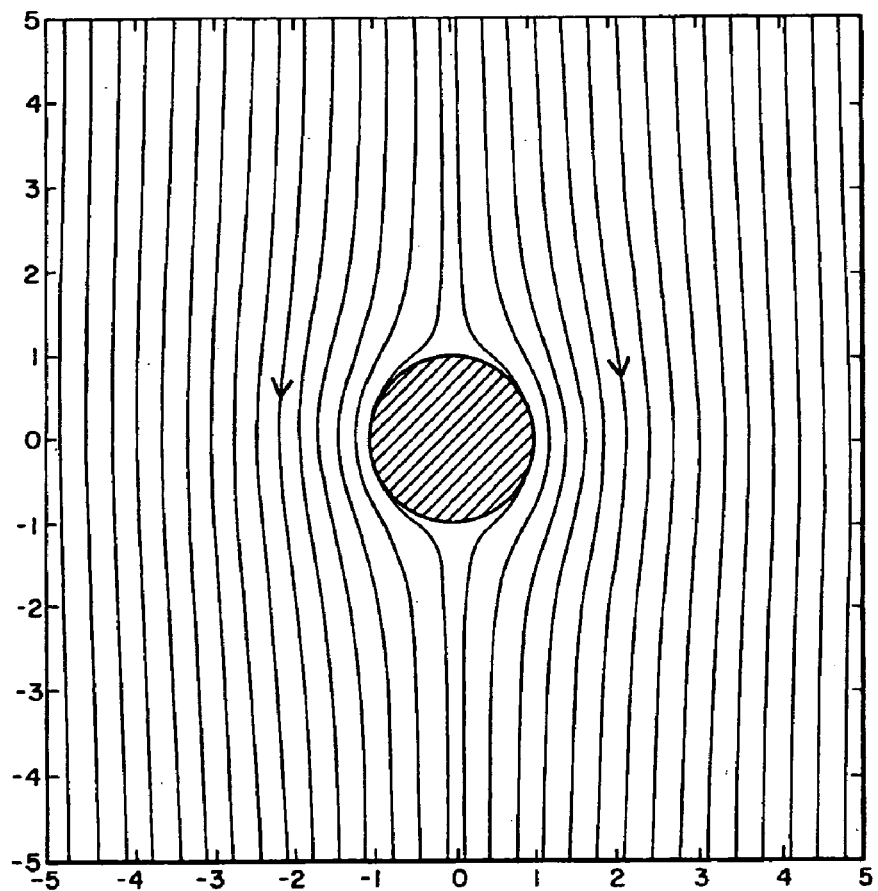

FIGS. 1A–1C are schematics of the evolution of an electric field around a solid conducting cylinder immersed in a liquid electrolyte, which illustrates the basic physical mechanisms underlying this invention. Just after an electric field is applied, it must intersect a conducting surface at right angles, as shown in FIG. 1A. Mobile ions in the liquid electrolyte are driven along electric field lines—positive ions in the direction of the field, and negative ions opposite the field direction. At the conductor/electrode surface, the field lines terminate, causing ions to accumulate in a small 'diffuse layer' and inducing an opposite 'image charge' in the conductor. From the geometry of the field lines, one can see that positive ions accumulate around the side of the conductor nearest the field source, on the top half of the cylinder in FIGS. 1A–1C, and negative ions around the side nearest the field sink. This induced-charge 'diffuse layer' grows, gradually expelling field lines, as shown in FIG. 1B, until all field lines are expelled (FIG. 1C). The steady state field configuration, as shown in FIG. 1C, is the same as that found around a perfect dielectric cylinder, and is attained after a time $t_c = \lambda a/D$, which is essentially the "RC" time of an equivalent resistor-capacitor circuit, where D is the diffusivity constant of the electrolyte.

This has important implications for the induced electro-osmotic fluid velocity. The cylinder is surrounded by a dipolar diffuse charge cloud that is positive on one hemisphere and negative on the other. On the top of the cylinder, the positively-charged diffuse cloud is driven along the field lines towards the 'equator' of the cylinder; on the bottom, the negatively-charged diffuse cloud is driven against the field direction—also towards the 'equator' of the cylinder. The resulting 'induced-charge electro-osmotic' slip velocity is quadrupolar in nature and will be described further in FIG. 2A. Generically, the induced fluid flow is driven from the 'poles' of the conducting body, towards its 'equator'.

The classical theory of electro-osmosis is based on the assumption that a solid object has a uniform charge density, or zeta potential, which is taken to be a constant material property. While this can be appropriately applied to insulating materials, such as latex, it is certainly not for conductors with free charges, especially out of equilibrium. Although it is not commonly appreciated, the double layers in such conductors will generally develop non-uniform polarizations in space and time in response to applied fields. In simple terms, the interfacial double layer acts as a nonlinear capacitor "skin" between the bulk liquid electrolyte and the conducting solid, and the local electro-osmotic slip, which varies in space and time, is simply given by the product of the tangential field and the potential difference across the capacitor "skin". For an arbitrary shaped conductor, this generally produces an electro-osmotic flow, which draws fluid along the field axis and ejects perpendicular to the field axis, for both AC and DC fields. Weaker flows of the same type can be produced around dielectrics, relying upon polarization by the orientation of bound dipoles rather than the separation of free charges.

Figure 2A:
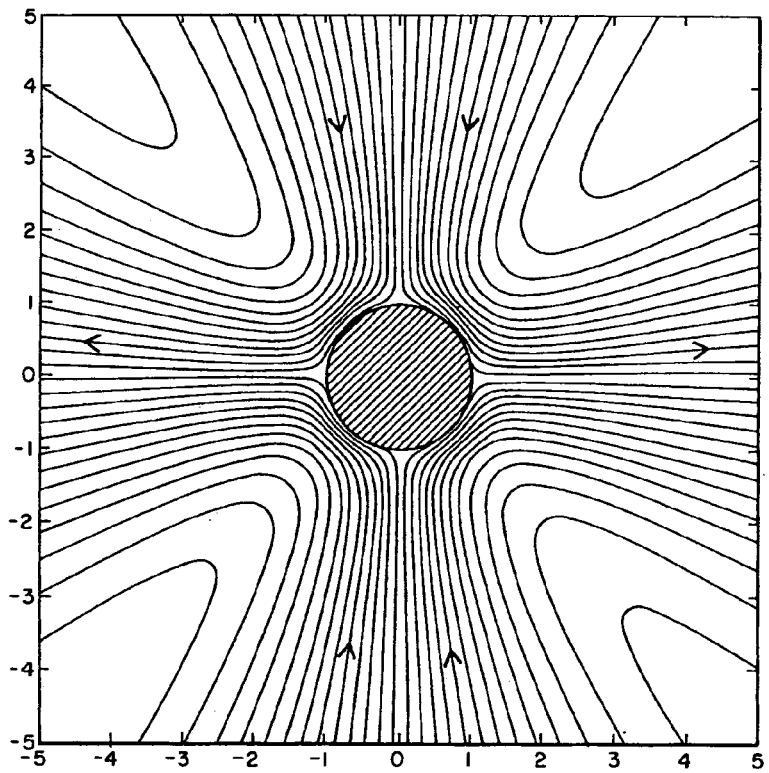
FIGS. 2A–2B are induced-charge electro-osmotic flows around an uncharged and charged cylinder.
Figure 2B:
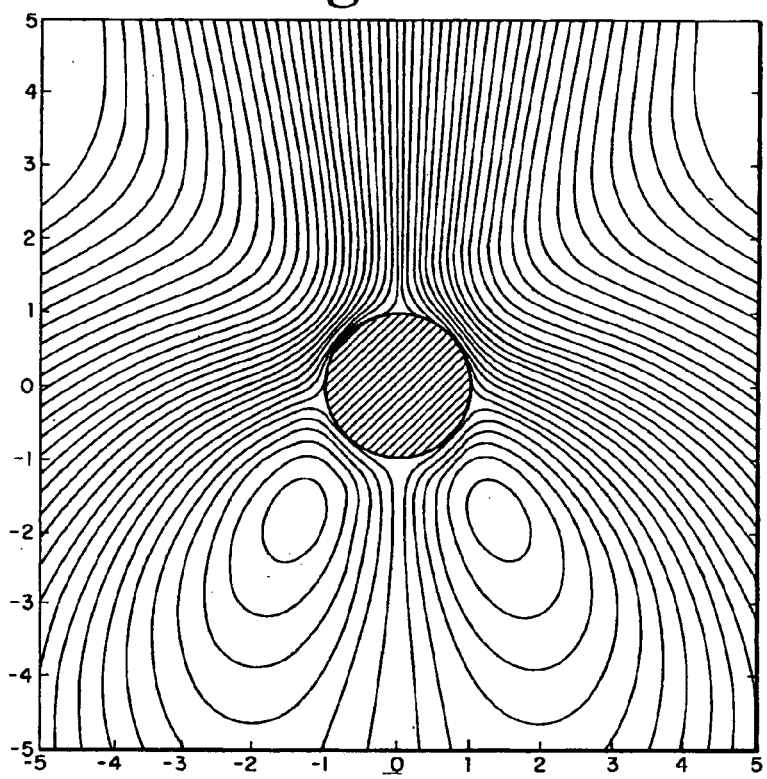

FIGS. 2A–2B show electro-osmotic flows around an uncharged and charged conducting cylinder. The induced-charge electro-osmotic flow, a shown in FIG. 2A, around the conducting cylinder in FIGS. 1A–1C can arise either from an applied background DC field after the charging time $\lambda a/D$ or from an applied field AC field with a frequency less than $\omega_c = D/\lambda a$. Using Eq. 1, one can identify the general sense of the electro-osmotic flow. On the side of the conductor facing the field source, the diffuse charge q is positive, so the fluid slips in the direction of the tangential field $E_\parallel$, forward toward the equator. On the other side, away from the field source, the diffuse charge is negative, so the fluid slips opposite the tangential field direction, toward the equator. Therefore, the electro-osmotic flow for any uncharged conductor generally pulls fluid in along the field axis toward both poles and expels it, radially from the equator, as shown in FIG. 2A.

In weak AC fields, if the field direction is reversed, then so are the signs of the induced charges, and thus the flow remains unchanged. Therefore, this electro-osmotic flow will persist even in an AC applied field. For example, it can be shown that the time averaged slip velocity for a conducting cylinder in a weak background AC field $E_0 \cos(\omega t)$ is given by, $$\langle u_\theta \rangle = \left(\frac{E_0^2 \varepsilon a}{\eta}\right)\left(\frac{2\sin 2\theta}{1+(\omega/\omega_a)^2}\right) \quad \text{EQ. 2}$$

where $\omega_a = D/\lambda a$ ($\approx 10^{3-10^5}$ for a $\approx 1-10$ μm and $\lambda \approx 1-10$ nm) is the characteristic double-layer charging frequency, above which the average electro-osmotic slip velocity vanishes because ions cannot relax quickly enough to keep up with the oscillating field. Note that the typical pumping velocities in weak fields are of the order of microns per second or more, depending on the applied field, which is comparable to other existing electrokinetic phenomena of potential use for microfluidic pumping, and much greater velocities can be achieved with strong fields. Note that the induced-charge electro-osmotic fluid velocity grows with the square of the applied field. This favorable nonlinear response can be exploited in our microfluidic devices to achieve much larger pumping velocities than with "normal electro-osmosis."

If there are no electrochemical reactions at the electrodes, the same diffuse-layer charging effect occurs at the electrode surfaces. It can be shown that following a suddenly imposed DC voltage, the electrode diffuse layers become charged and screen out the bulk electric field at the time scale, $\tau_L = \lambda L/D$, where L is the distance between the electrodes. Similarly, for an AC field with applied voltage $V_0 \cos(\omega t)$, the bulk electric field amplitude is given by $$E_0 = \left(\frac{V_0}{L}\right)\left(\frac{1}{1+(2\omega_L/\omega)^2}\right) \quad \text{EQ. 3}$$

which decays to zero above the characteristic frequency $\omega^t = D/\lambda L \approx 10^{2-10^4}$ Hz for $L \approx 10-100$ μm and $\lambda \approx 1-10$ nm. Therefore, strong induced-charge electro-osmotic flows driven by AC applied voltages can persist only in a certain band of driving frequencies, $\omega_L \leq \omega \leq \omega_a$.

FIG. 2B demonstrates the induced-charge electro-osmotic flow around a charged cylinder. If the cylinder is electrically isolated with a non-zero charge, then the electro-osmotic flow described herein is combined with the familiar normal electro-osmotic flow, which simply wraps around the object, like the field lines shown in FIG. 1C. The induced-charge electro-osmotic flow is a combination of the two flows, and is shown in FIG. 2B. Since the latter flow is proportional to the field and the total charge, it changes direction if the electric field is reversed, and therefore, it averages to zero in an AC field, leaving only the quadrupolar induced-charge electro-osmotic flow as shown in FIG. 2A once again, regardless of the total charge of the conductor.

Figure 3A:
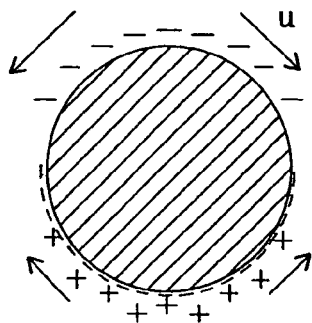
FIGS. 3A–3C are induced charge distribution and slip velocities for various asymmetric conducting objects in a DC or AC field.
Figure 3B:
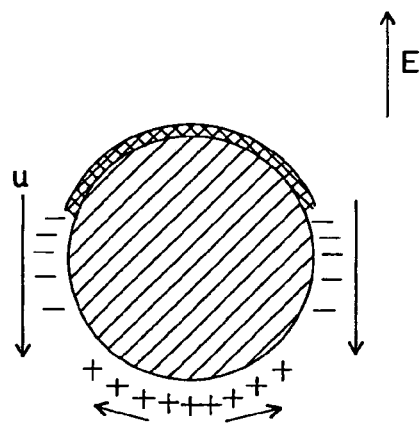
Figure 3C:
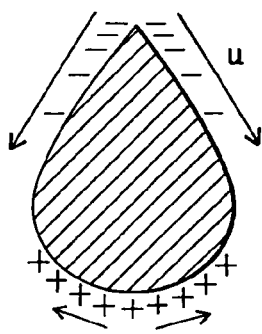

FIGS. 3A–3C are induced-charge distributions and slip velocities for various asymmetric conducting objects in a DC or AC field. By manipulating the fore-aft symmetry of a conductor in a DC or AC applied field, a net osmotic flow along the field axis or a net phoretic swimming velocity can be produced. For example, FIG. 3A demonstrates a conducting cylinder whose fore-aft symmetry is broken through the application of a metallic coating with a higher Stern compact layer capacitance, shown by the dashed lines, which absorbs ions and prevents them from producing electro-osmotic slip. This reduces the pumping effect on the coated side relative to the uncoated side, resulting in a net flow past the object.

FIG. 3B shows a different arrangement that produces a directed electro-osmotic osmotic flow, even in an AC field. The arrangement includes a cylinder, which is partially insulated with a dielectric coating used to suppress double-layer charging (schematically represented with a layered strip). Following a time-dependent diffuse-layer charging analogous to that in FIGS. 1A–1C, the effect of the dielectric coating (for the field direction indicated) is to bring the negative ions towards the sides of the cylinder and the positive ions on the bottom region of the cylinder. The slip velocity produced by the negative charges is directed downward past the equatorial region of the cylinder, towards the uncoated side. The positive charges also produce a slip velocity directed upward toward the equatorial region of the cylinder. Note that the magnitude of the slip velocity formed by the negative charges is larger in magnitude than the slip velocity formed by the positive charges, due to the stronger tangential field near the equator compared to that near the pole. The net osmotic flow would thus be directed downward, toward the uncoated side. It is important to note as well that a conducting cylinder, which is entirely coated with a dielectric layer has a greatly reduced induced-charge electro-osmotic fluid flow; it is thus important to work with clean conductor/electrolyte surfaces.

FIG. 3C is another asymmetric arrangement that can produce a directed induced-charge electro-osmotic flow under the influence of an AC electric field. The arrangement includes a tear-drop asymmetric shaped conductor—or more generally, any asymmetrically-shaped body. When a background field is applied, the tear-drop asymmetric shaped conductor produces positive and negative charge regions. The negative charge regions include the most curved region, the upper region in FIG. 3C, of the tear-drop shaped conductor. The positive regions include the less curved portion of the tear-drop shaped conductor, the lower region in FIG. 3C. The direction of the slip velocity formed by the negative charge regions is directed downward, and the direction of the slip velocity formed by the positive charge regions is upward along the tear-drop shaped conductor. The magnitude of the slip velocity produced by the negative charge regions is larger than the magnitude of the slip velocity produced by the positive charge regions. Therefore, the net electro-osmotic flow is directed towards the region of lower curvature, downward along the tear-drop shaped conductor shown in FIG. 3C.

Note if the direction of the background field changes, the charge distribution also changes. For example, the negative regions will include the bottom regions of the tear-drop shaped conductor, and the positive charge regions will include the upper most curve regions of the tear-drop shape conductor. However, the field driving the induced-charge electro-osmotic flow is also reversed, so that the net electro-osmotic flow remains a net downward, away from the pointed edge. The same is true of all of the symmetry-breaking situations in FIGS. 3A–3C: The net flow persists in an AC field. This is very different from normal electro-osmosis, which averages to zero in an AC field.

All of the conductor configurations in FIGS. 3A–3C have a symmetry, which is broken in the fore-aft sense, measured relative to the applied field direction. The left-right symmetry of the conductor could also be broken, leading to induced-charge electro-osmotic flows which are driven perpendicular to the applied field, and which persist even in AC fields.

Figure 4A:
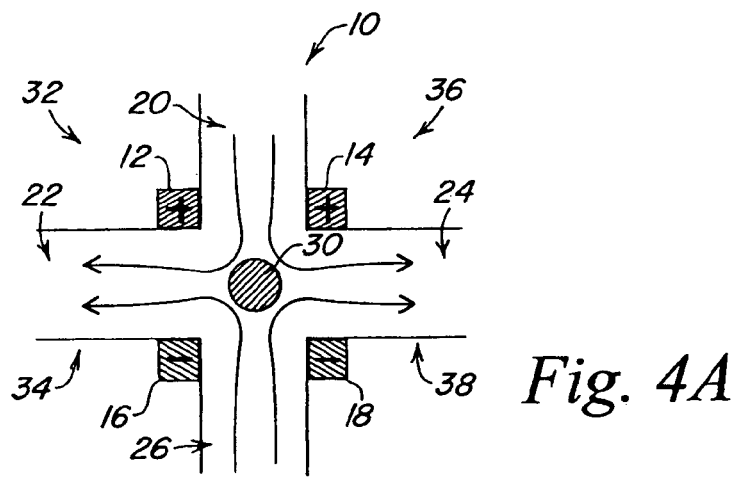
FIGS. 4A–4C are schematics of induced-charge electro-osmotic micropump designs for sample cross, elbow, and T junctions.
Figure 4B:
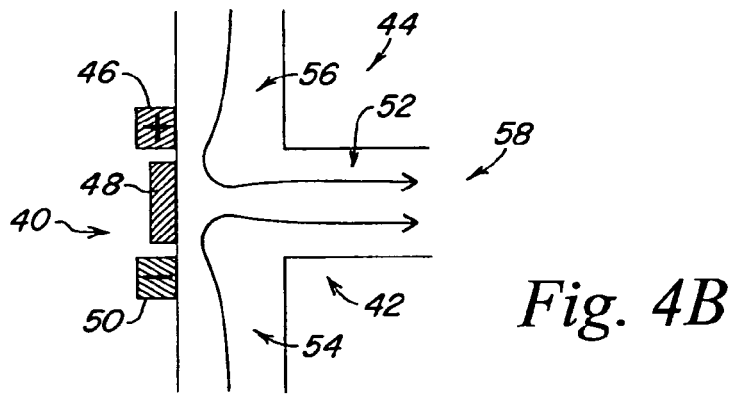
Figure 4C:
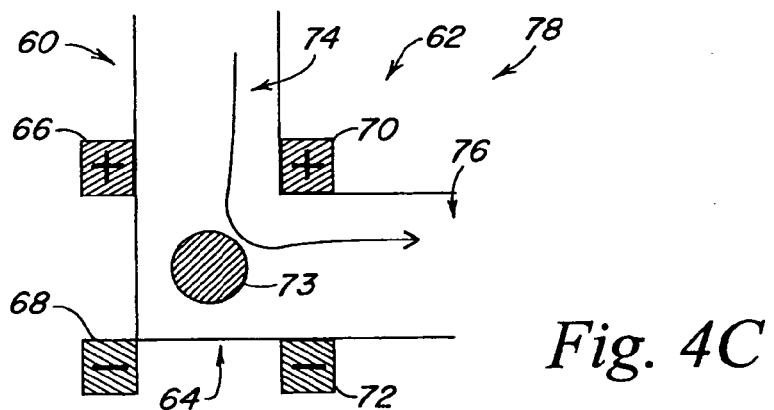

FIGS. 4A–4C are schematics of electro-osmotic micropump designs for cross, T, and elbow junctions. Using the principles hereinbefore regarding electro-osmotic flow, one can design different junction pump arrangements. By using a working conductor in conjunction with an applied electric field, the induced-charge electro-osmotic flow generally drives fluid flow in along the field axis and ejects it out from the 'equator', perpendicular to the field axis. This effect can be used to pump fluid at right angles, by simply placing a cylindrical conducting wire in the junction, perpendicular to the field axis and the plane of flow.

For example, FIG. 4A demonstrates a microfluidic cross-shaped micropump design 10. The cross-shaped micropump design 10 includes four junction walls 32, 34, 36, and 38, four electrodes 12, 14, 16, and 18, and a cylindrical conductor 30. The cylindrical conductor 30 has transient surface charges in the applied field, which drive the electro-osmotic flow. In the configuration of FIG. 4A, electrodes 12 and 14 have the same polarity whereas electrodes 16 and 18 have the opposite polarity, which sets up a field in the vertical direction, causing a pumping of fluid from the vertical channels into the horizontal channels. By switching electrode polarity so that electrodes 12 and 16 have the same polarity and electrodes 14 and 18 have the opposite polarity, the field can be switched from vertical to horizontal, and the pumping direction can be reversed. Also, the cylindrical conductor is strategically placed at the intersection point between the microchannels 20, 22, 24, and 26.

FIG. 4B demonstrates a T-junction micropump arrangement 58. The T-junction micropump arrangement 58 includes junction walls 40, 42, and 44, a pair of electrodes 46 and 50, and a conducting plate 48 placed on the junction wall 40 between the pair of electrodes 46 and 50. The flow is directed into the microchannel 52. In this embodiment, the polarities of the pair of electrodes 46 and 50 cannot be reversed, thus preventing the reversal of the pump. However, a reversible T-junction can also be designed with four electrodes and a conduction post, like in FIG. 4A with one channel closed. This allows the flow direction to be driven either into or out of microchannel 52.

FIG. 4C demonstrates an elbow junction arrangement 78. This arrangement includes four electrodes 66, 68, 70, and 72, a cylindrical conductor 73, and junction walls 60, 62, and 64. The electrodes 66, 68, 70, and 72 are aligned on the junction walls 60, 62, and 64. The cylindrical conductor 73 is strategically placed in the center of intersection point between microchannels 74 and 76. By placing the cylindrical conductor 73 in the junction, perpendicular to the field axis and the plane of flow, the fluid is driven around a corner to microchannel 76. In this embodiment, the electrodes 66 and 70 have the same polarity and the electrodes 68 and 72 have the opposite polarity, and the direction of the pumping is from microchannel 74 toward microchannel 76. However, by driving electrodes 66 and 68 with the same polarity, and 70 and 72 with polarity opposite to that of electrodes 66 and 68, the direction of flow is reversed, pumping fluid into microchannel 74.

The junction pumps shown in FIGS. 4A–4C and described above can be operated using a DC electric field or an AC electric field, or a pulsed AC electric field. Furthermore, the 'working' conductor in each of these devices can be electrically isolated from the electrodes, which drive the electric field; or the working conducting element can be held at a fixed potential or grounded. Holding the working conductor at a fixed potential induces an additional induced-charge electro-osmotic flow that is proportional to the square of the applied field, and is directed away from the nearest wall. This additional flow can be incorporated into any of the devices described herein, enhancing the fluid flow driven into certain channels in the micropumps, or providing an additional mixing flow in the mixers described below.

Figure 5A:
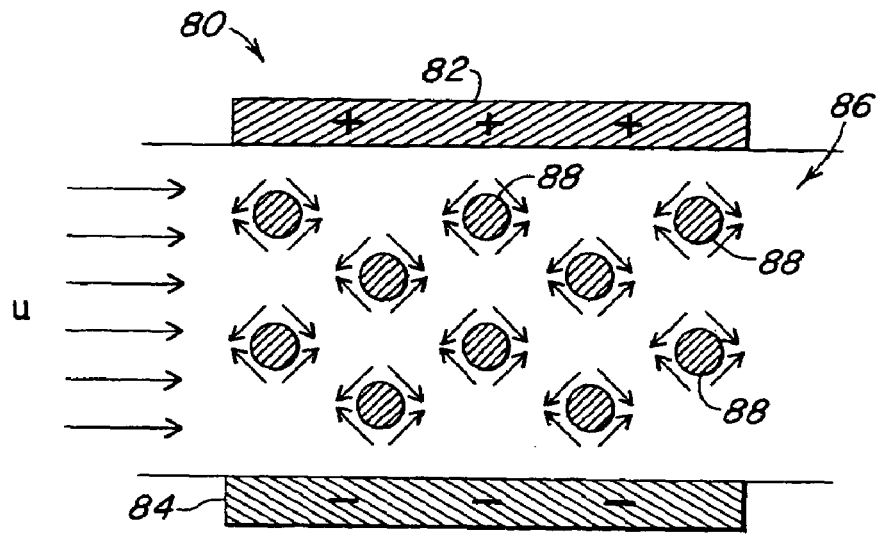
FIGS. 5A–5B are schematics of induced-charge electro-osmotic mixers.
Figure 5B:
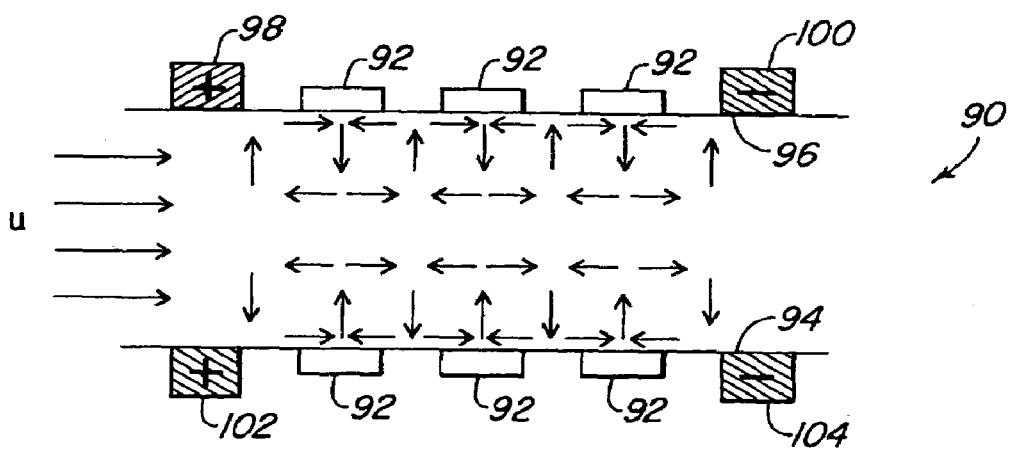

FIGS. 5A–5B are schematics of AC electro-osmotic mixers. In FIG. 5A, a design is provided for a fast induced-charge electro-osmotic mixer 80. The mixer 80 includes a pair of microelectrodes 82 and 84 and an array of conducting posts 88. The electrode 82 is positive and the electrode 84 is negative, and their polarities can be reversed. The conducting posts 88 include metallic wires, as in the junction pumps described herein. A background flow passes through the array of conducting posts 88. Also, an AC field in the appropriate frequency range ($\omega_L \leq \omega \leq \omega_a$) is applied perpendicular to the posts 88 and to the mean flow direction, which generates an array of persistent convection rolls via the same electro-osmotic mechanism used in the junction pumps, described herein. The particles in the background flow are advected through convection rolls along complicated trajectories, which stretch fluid elements. This enhances diffusive mixing. Using pulsed AC fields to produce chaotic flows can also further enhance the degree of mixing.

FIG. 5B demonstrates another design for a fast electro-osmotic mixer 90. The mixer 90 includes four electrodes 98, 100, 102, and 104 and metal strips 92 embedded in the interior of the channel walls 94 and 96. This design produces the same kind of convective mixing produced by the mixer 80. By applying an AC or DC field along the channel with the metal strips 92 embedded within channel walls 94 and 96 in between electrodes 98, 100, 102, and 104. Various arrows illustrate the convection mixing. As with posts 88 described herein, are electrically isolated from the electrodes 98, 100, 102, and 104. If the metal strips 92 were grounded or held at a fixed potential, an additional induced-charge electro-osmotic flow would result, in addition to the flow described here.

Figure 6A:
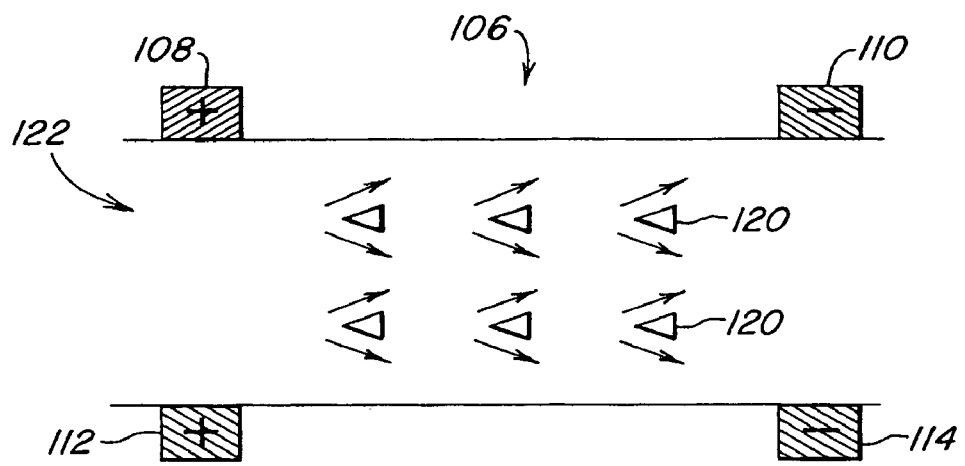
FIGS. 6A–6B are schematics of sample pumps driven by induced-charge electro-osmotic flows generated at asymmetric conducting posts.
Figure 6B:
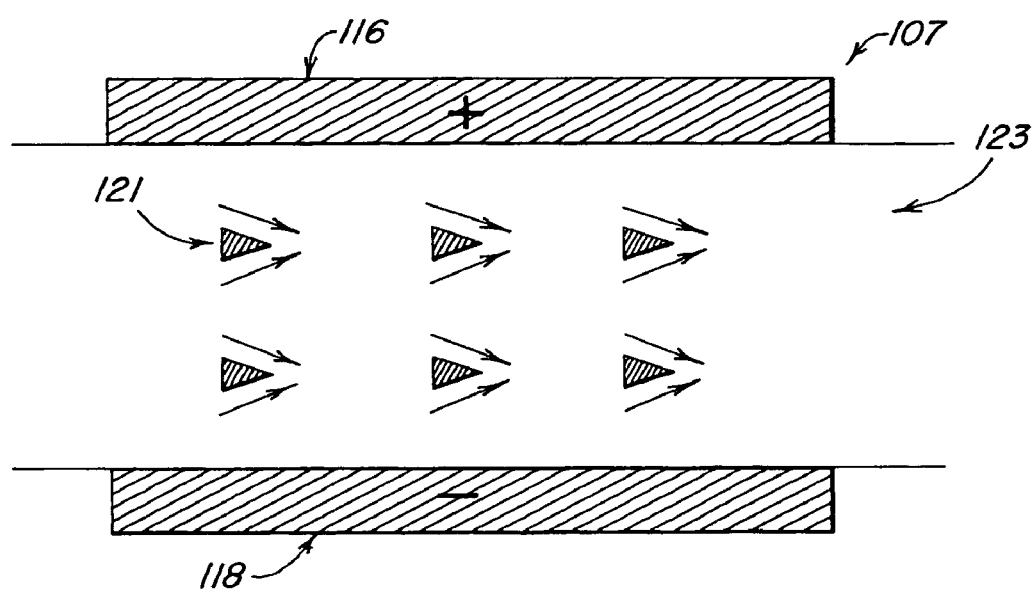

FIGS. 6A–6B are schematics of pumps driven by electro-osmotic flows generated at asymmetric conducting posts. As described herein, a conductor in AC or DC applied fields with broken fore-aft or left-right symmetry generally produce net electro-osmotic pumping along the direction of broken symmetry. Therefore, it is possible to produce linear channel pumps using conducting posts, which possess broken asymmetry. Triangular conducting posts 120 are shown in FIGS. 6A–6B and represent any method of breaking the symmetry of the conducting array, of which three examples are shown in FIGS. 4A–4C. Furthermore, the applied field can either be along the direction of the channel as shown in FIG. 6A or across the channel, perpendicular to it as shown in FIG. 6B. In all cases, fluid flow is driven along the channel.

FIG. 6A demonstrates a linear-channel pump 106. The linear-channel pump 106 includes electrodes 108, 110, 112, and 114, asymmetric conducting posts 120, and a microchannel 122. FIG. 6B demonstrates a linear-channel pump 107. The linear-channel pump 107 includes electrodes 116 and 118, asymmetric conducting posts 121, and a microchannel 123. The posts 120 and 121 are schematically represented by triangles to indicate any of the general symmetry-breaking mechanisms, of which three are shown in FIGS. 4A–4C. The linear channel pumps 106 and 107 are driven by electro-osmotic flows generated by posts with symmetry broken in the channel direction, and an AC or DC field directed along or across the microchannels 122 and 123. Other broken symmetry conducting posts, such as conducting posts having a cross-section of a tear-drop or triangle, dielectric or metallic partial coatings, can also be used. In the case of a broken fore-aft spatial symmetry, as shown in FIG. 6A, the sharpest point of the cross section is directed opposite to the desired flow direction of induced-charge electro-osmotic pumping. In the case of a broken left-right spatial symmetry, as shown in FIG. 6B, the sharpest point of the cross section is directed in the desired direction of induced-charge electro-osmotic pumping. A more economical approach to such posts 120 and 121 may be to simply place two or more wires of different cross sections against each other to approximate the triangle's shape. In this way, an AC electro-osmotic linear-channel pump can be built out of ordinary metal micro-wires of circular cross-section.

Unlike the junction pumps described herein, which are driven by a single electro-osmotic source that cannot drive flows across very large distances, the asymmetric posts can be arranged in extended arrays to provide the distributed forcing needed to drive fluid quickly along lengthy channels.

Figure 7A:
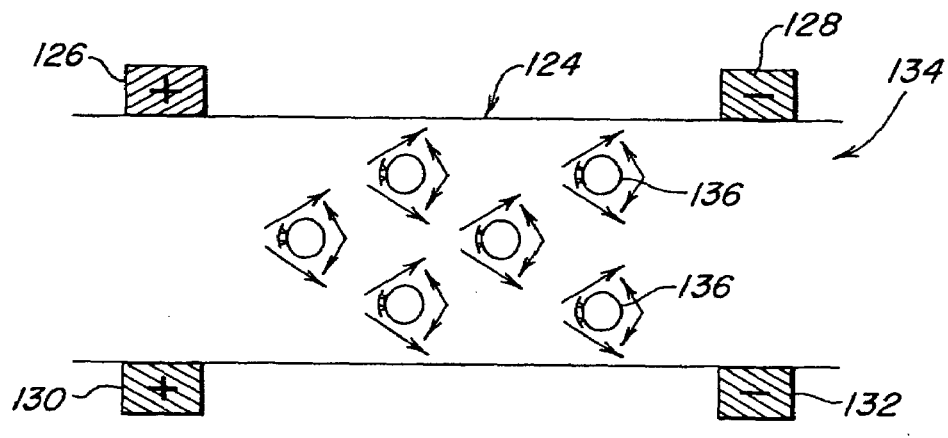
FIGS. 7A–7B are schematics of linear-channel pump-mixers driven by electro-osmotic flows.
Figure 7B:
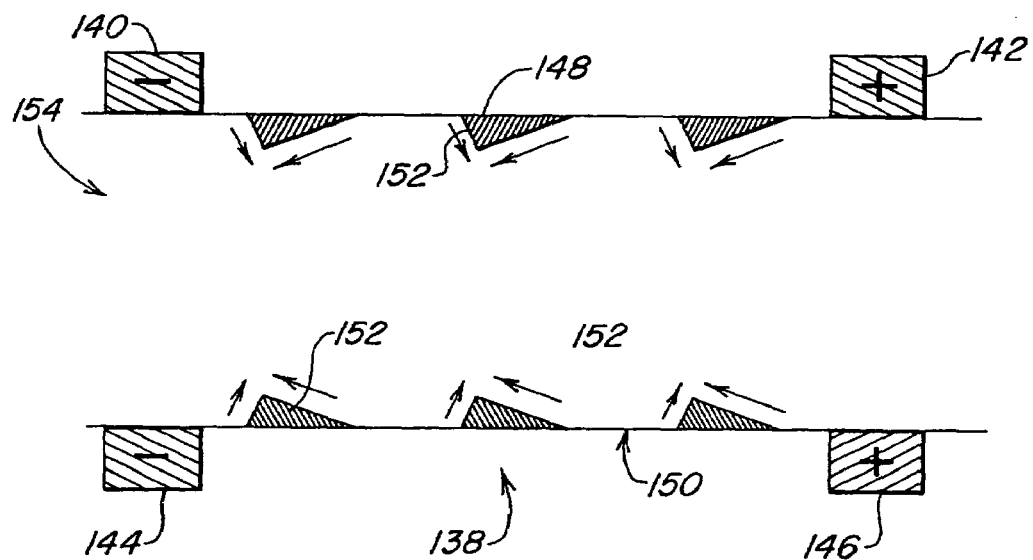

FIGS. 7A–7B are schematics of linear-channel pump-mixers driven by electro-osmotic flows. The design of the linear-channel pump can be altered to produce microfluidic devices, which can simultaneously pump and mix fluids. FIG. 7A demonstrates a pump-mixer arrangement 124 that includes electrodes 126, 128, 130, and 132, asymmetric conducting posts 136 associated with a cylinder covered with a dielectric or metallic coating, and a microchannel 134. The electrodes 126, 128, 130, and 132 permit reversing their polarities and producing AC or DC fields. Instead of four electrodes, two electrodes, as in FIG. 6B, placed on either side of the channel and driving an AC or DC electric field perpendicular to the channel direction can also be used. The coatings of the conducting posts 136 are directed opposite the flow direction, in an AC or DC field directed along the microchannel 134. Given that each of the conducting posts 136 produces flows that are directed in along the field axis and out perpendicular to the field axis, this provides an overall mixing pattern shown in FIG. 7A. Also, the asymmetric shape provides the necessary force to pump fluid through the microchannel 134. Of course, any broken symmetry will be sufficient to produce a pump/mixer, as discussed above.

FIG. 7B demonstrates another arrangement of a linear-channel pump-mixer 138. The pump-mixer 138 includes four electrodes 140, 142, 144, and 146 and asymmetric metal ridges 152 patterned on the walls 148 and 150 of a microchannel 154 between the electrodes 140, 142, 144, and 146. The electrodes 140, 142, 144, and 146 allow reversing their polarities and producing AC or DC fields. The asymmetric ridges 152 are designed to lean in the direction of the flow, in an AC or DC field directed along the microchannel 154. The surface of the asymmetric ridges 152 is a grooved metallic surface, not connected in any way to the external circuit, which includes normal electrodes positioned in the channel walls 148 and 150 on either side of the grooved surface.

While we have indicated electrode and field polarities as "+" and "−" signs throughout, all fields can also be AC or DC corresponding to electrode polarities oscillating between + and −, giving rise to the same induced-charge electro-osmotic flow. Thus all of the devices presented here can operate in AC or DC.

The invention provides a number of designs for microfluidic devices taking advantage of induced-charge electro-osmotic flows around conductors. Although these devices can operate with DC voltages, the invention also works with AC applied voltages. Moreover, the flow speeds generated by these devices grow nonlinearly with applied voltage, and thus can in principle greatly exceed the speeds achieved in existing electro-osmotic devices. Also, the invention is simple to produce without requiring very sophisticated microfabrication.

Although the present invention has been shown and described with respect to several preferred embodiments thereof, various changes, omissions and additions to the form and detail thereof, may be made therein, without departing from the spirit and scope of the invention.

The invention claimed is:

1. A microfluidic device comprising:
   one or more microchannels providing a passageway for transmitting an electrolyte fluid;
   at least one pair of electrodes providing a defined electric field in said one or more microchannels, each electrode of said at least one pair of electrodes being located on a laterally opposite wall of one of the one or more microchannels directly across or offset from the other electrode of the electrode pair or said at least one pair of electrodes;
   at least one conductor element that is placed between said at least one pair electrodes into a microchannel or microchannel junction, wherein interactions between said defined field and said at least one conductor element produces electro-osmotic flows so that said electrolyte fluid is driven across said one or more microchannels.

2. The microfluidic device of claim 1, wherein said defined field is comprised of a DC electric field.

3. The microfluidic device of claim 1, wherein said defined field is comprised of an AC or pulsed AC electric field.

4. The microfluidic device of claim 1, wherein said at least on pair of electrodes is comprised of electrodes of different polarities.

5. The microfluidic device of claim 1, wherein said conductor element is comprised of a symmetric cylinder of a defined radius.

6. The microfluidic device of claim 5, wherein said electro-osmotic flow is used for pumping said electrolyte fluid across said one or more microchannels.

7. The microfluidic device of claim 6, wherein said one or more microchannels form a cross-junction.

8. The microfluidic device of claim 6, wherein said one or more microchannels form an elbow-junction.

9. The microfluidic device of claim 1, wherein said at least conductor element is comprised of an asymmetric conductor element, with either non-uniform surface composition or non-circular cross section.

10. The microfluidic device of claim 9, wherein said electro-micro flows is used for pumping and mixing said electrolyte fluid across said one or more microchannels.

11. The microfluidic device of claim 1, wherein said at least one conductor element is comprised of a conducting strip.

12. The microfluidic device of claim 11, wherein said conducting strip is placed in the interior portion of a wall of said one or more microchannels.

13. The microfluidic device of claim 12, wherein said electro-osmotic flow is used for pumping said electrolyte fluid across said one or more microchannels.

14. The microfluidic device of claim 13, wherein said one or more microchannels form a T-junction.

15. The microfluidic device of claim 1, wherein said at least conductor element is comprised of a symmetric conductor element.

16. The microfluidic device of claim 15, wherein said electro-micro flows is used for pumping and mixing said electrolyte fluid across said one or more microchannels.

17. The method of claim 1, wherein said at least conductor element is comprised of a symmetric conductor element.

18. The method of claim 17, wherein said electro-micro flows is used for pumping and mixing said electrolyte fluid across said one or more microchannels.

19. A method of forming a microfluidic device, said method comprising:
providing one or more microchannels transmitting a passageway for sending an electrolyte fluid;
providing at least one pair of electrodes providing a defined field in said one or more microchannels, each electrode of said at least one pair of electrodes being located on a laterally opposite wall of one of the one or more microchannels directly across or offset from the other electrode of the electrode pair or said at least one pair of electrodes;
providing at least one conductor element that is placed between said at least one pair electrodes into a microchannel or microchannel junction;
allowing interactions between said field and said at least one conductor element; and
producing induced-charge electro-osmotic flows so that said electrolyte fluid is driven across said one or more microchannels.

20. The method of claim 19, wherein said defined field is comprised of a DC electric field.

21. The method of claim 19, wherein said defined field is comprised of an AC electric field.

22. The method of claim 19, wherein said at least one pair of electrodes is comprised of electrodes of different polarities.

23. The method of claim 19, wherein said conductor element is comprised of a symmetric cylinder of a defined radius.

24. The method of claim 23, wherein said electro-osmotic flow is used for pumping said electrolyte fluid across said one or more microchannels.

25. The method of claim 24, wherein said one or more microchannels form a cross-junction.

26. The method of claim 24, wherein said one or more microchannels form an elbow-junction.

27. The method of claim 19, wherein said at least one conductor element is comprised of an asymmetric conductor element.

28. The method of claim 27, wherein said electro-micro flows is used for pumping and mixing said electrolyte fluid across said one or more microchannels.

29. The method of claim 19, wherein said at least one conductor element is comprised of a conducting strip.

30. The method of claim 29, wherein said conducting strip is placed in the interior portion of a wall of said one or more microchannels.

31. The method of claim 30, wherein said electro-osmotic flow is used for pumping said electrolyte fluid across said one or more microchannels.

32. The method of claim 31, wherein said one or more microchannels form a T-junction.

* * * * *